United States Patent [19]

Lu

[11] Patent Number: 5,461,356
[45] Date of Patent: Oct. 24, 1995

[54] ALARM SYSTEM WITH GRAPHITE SENSOR

[76] Inventor: Guixian Lu, P.O. Box 876, Lake Orion, Mich. 48361

[21] Appl. No.: 254,598

[22] Filed: Jun. 6, 1994

[51] Int. Cl.⁶ .................................................. B60R 25/10
[52] U.S. Cl. .................. 340/427; 324/525; 340/429; 340/566
[58] Field of Search ................... 340/537, 561, 340/562, 566, 542, 427, 429; 325/525, 526

[56] References Cited

U.S. PATENT DOCUMENTS

| | | | |
|---|---|---|---|
| 2,987,702 | 6/1961 | Yohe | 340/473 |
| 4,382,252 | 5/1983 | Ohashi et al. | 340/561 |
| 4,926,129 | 5/1990 | Wasley et al. | 340/605 |
| 4,931,741 | 6/1990 | Koppitsch et al. | 324/525 |
| 5,015,958 | 5/1991 | Masia et al. | 340/537 |
| 5,155,467 | 10/1992 | Matsubara | 340/566 |
| 5,266,924 | 11/1993 | Chung | 340/429 |

*Primary Examiner*—Brent A. Swarthout

[57] ABSTRACT

An electronic alarm system using graphite sensor will be activated when the sensor is either cut, shorted, or touched. A rapid change of the sensor signal will be detected by a differential section when the sensor is touched, but not a slowly drifting sensor signal when the sensor is not touched. A comparing section takes positive or negative signal to activate the alarm system by sending a signal to a output section.

11 Claims, 3 Drawing Sheets

ALARM SYSTEM WITH GRAPHITE SENSOR

BACKGROUND OF THE INVENTION

This invention relates to an electronic alarm system with graphite sensor.

It is well known that graphite is sensitive to pressure in terms of resistance. This is advantageous to tactile sensors or bending sensors. Another advantage of using graphite is that it is inexpensive and easy to fit into any container to become a sensor. The problem is that it's resistance is drifting slowly all the times which may give a fake signal.

The present invention provides an electronic circuit to utilize the sensitivity of graphite and avoid the problem. The sensor may be a tactile sensor for robotics, a bending sensor, or other sensors that need sensitivity but accuracy.

SUMMARY OF THE INVENTION

An object of the present invention is to provide an alarm system for a motor cycle or the like that will give an alarm either when the sensor is touched or bent, or when the wires to the sensor are cut or shorted so that thieve have no time to pick the lock before the vehicle can be driven.

Another object of the present invention is to provide an alarm system with sensor that are flexible and easy to be setup in different places.

For this purpose the present invention provides an electronic alarm system comprising a sensor section with a graphite sensor, a differential section differentiating signals from said sensor section, a comparing section for detecting the existence of positive or negative differential signal, an output section for amplifying signal and giving alarms, and a case for most of the parts. There may be a delay section to prolong the alarm time.(not shown)

The sensor section comprises a graphite sensor and a resistor connected in series. The sensor and the resistor may be embedded in a resistor bridge (as shown in FIG. 4) or by themselves (as shown in FIG. 2). The sensor is made of hoses or other containers filled with graphite each of which has electrodes and electrical connections at opposite sides thereof. The containers can be connected in either parallel or series to become one sensor. There are magnets connected to the container so that the sensor can be easily positioned at magnetic parts to cover the key hole of a motor cycle and other important parts, including the case of the alarm system, that need protection. Graphite provides resistance for the sensor. A change of shape of the sensor will affect the resistance of the graphite and activate the alarm system.

A change of resistance of the sensor will give a change of output voltage from sensor section, called a sensor signal. The differential section which is connected at the output of the sensor section comprises a differential resistor and a capacitor in series. In a balance state, the electrical potential of the capacitor is equal to the sensor signal and no current is passed through the differential resistor. A change of sensor signal will cause a significant current through the differential resistor to the capacitor until the electrical potential of the capacitor is equal to the sensor signal again. The current through the differential resistor generates a voltage drop on it as a differential signal. The differential section is arranged so that it does not give a differential signal capable to activate the alarm system when the sensor signal is only drifting slowly which happens even when the shape of the sensor is not changed. The differential section gives a significant differential signal that will activate the alarm system only when the sensor signal changes rapidly because of bending or touching of the sensor. The differential signal may be positive or negative. The comparing section is arranged so that it takes positive or negative differential signal and passes it to the output section as a positive signal. In the preferred embodiment, the comparing section comprises four diodes forming a diode bridge that rectify the differential signal. The output section amplifies signal from the comparing section and operate the buzzer. Either cutting or shorting the wire connected to the sensor will change the resistance of the sensor and activate the alarm system.

DESCRIPTION OF THE PREFERRED EMBODIMENTS

Figure 1:
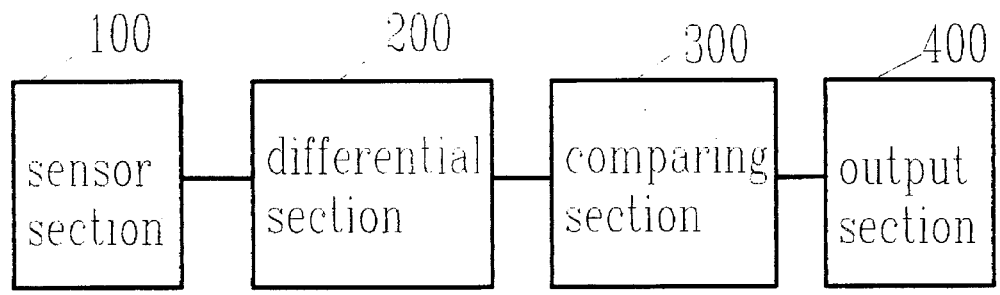
FIG. 1 shows a block diagram of an embodiment of the present invention.
Figure 2:
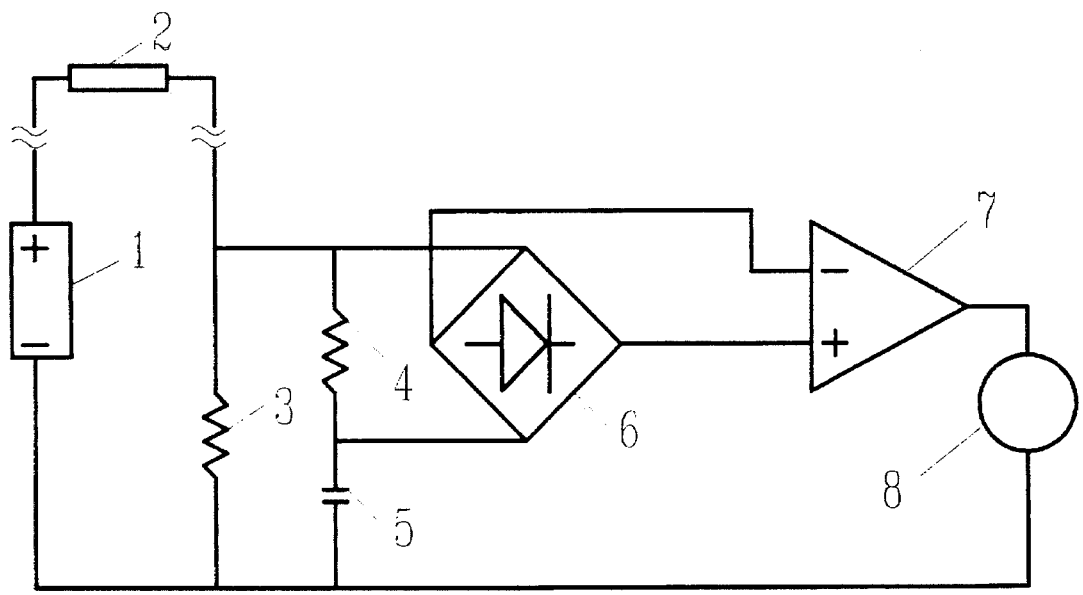
FIG. 2 is an electronic circuit diagram of an embodiment of the present invention.
Figure 5:
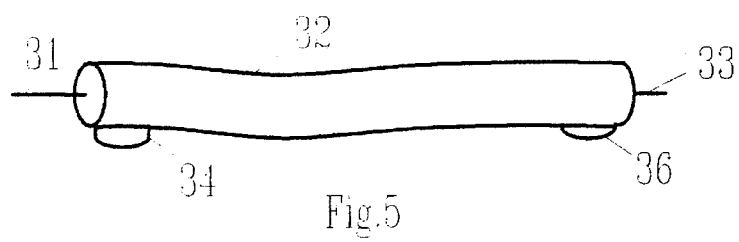
FIG. 5 shows a physical embodiment of a sensor made of a hose filled with graphite.
Figure 6:
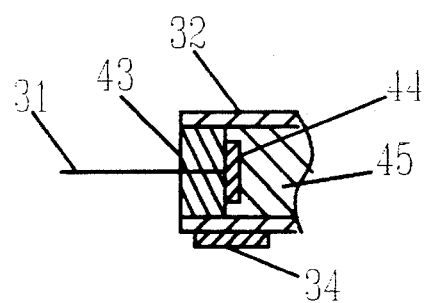
FIG. 6 is a fragmentary sectional view of the sensor in FIG. 5.

FIG. 1 shows a block diagram of an embodiment of the present invention. Sensor section 100 is connected to differential section 200 and the differential section is connected, in turn, to comparing section 300. Finally, comparing section is connected to output section 400. FIG. 2 shows an electronic circuit diagram of the first embodiment. The whole electronic circuit, including the operational amplifiers 7 (The power connections are not shown.), gets power from a direct-current source 1. The sensor section comprises a sensor 2 made of graphite and a resistor 3 in series. Hose 32 in FIG. 5 has magnets 34 and 36 to stick to magnetic parts. 31 and 33 are electrical connections. FIG. 6 shows a cover 43 for the hose 32, an electrode 44, and graphite 45 contained in hose 32. Graphite acts as a conductor defining the resistance of the sensor 2. The resistance of the resistor 3 is close to that of the sensor 2 to maximize the output. The resistance of the sensor 2 can not be too large or it does not pass enough current to activate the alarm system. In the preferred embodiment, both the sensor 2 and the resistor 3 are 10 kilo-ohms. The sensor signal is taken from the voltage drop on the resistor 3 or the sensor 2. A change in shape of the sensor 2 will change the voltage drop on the sensor 2 and that on the resistor 3, causing a change of the sensor signal. The differential section comprises differential resistor 4 and capacitor 5 in series which are connected at the output of the sensor section 100. In a balanced state, or when the sensor signal has not changed for a long enough time, the capacitor has been charged to the sensor signal so that no current flows through the differential resistor 4 and no voltage drop on differential resistor 4 which is the differential signal from the differential section. When a sensor signal changes, the capacitor 5 will be charged or discharged to follow the sensor signal which will cause a current through the differential resistor 4 and a differential signal. A too large resistance of the differential resistor 4 will cause a fake differential signal because of slowly drifting resistance in the sensor 2 without changing the shape of the sensor or the alarm will last too long. Too low resistance of resistor 4 will not be able to generate enough differential signal to activate the alarm system. Too large capacity of the capacitor 5 will prolong the alarm for too long. Small capacity shorten the alarm time. In the preferred embodiment, the differential resistor 4 is 8 kilo-ohms and the capacitor 5 is 25 micro farad. Since the current flowing through the differential resistor 4 can be in either directions, the differential signal may be positive or negative. The comparing section 300 comprises a diode bridge 6 which rectifies the differential signal to positive. The input terminals of the diode bridge 6 are connected to two ends of differential resistor 4. The diodes are preferably germanium to minimize the voltage drop on the comparing section. The output section comprises an operational amplifier 7 and an alarm device which is the buzzer 8. The input terminals of the amplifier 7 are connected to the output terminals of the diode bridge 6 so that the amplifier 7 can amplify the signal from the comparing section and activates the alarm device.

Figure 3:
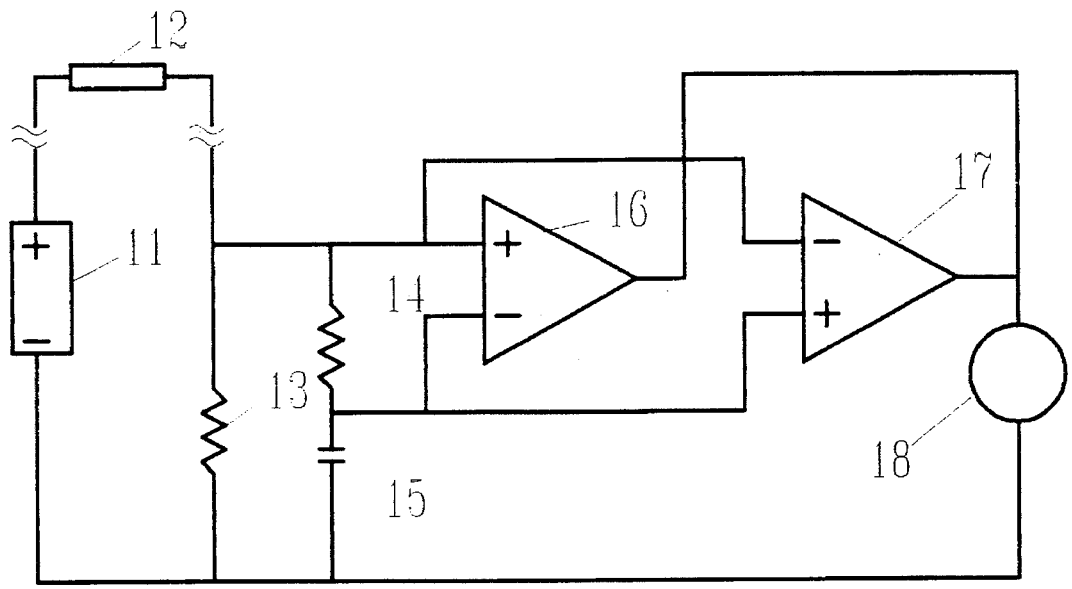
FIG. 3 is an electronic circuit diagram of second embodiment of the present invention.

FIG. 3 shows an electronic circuit of second embodiment. It is substantially identical to the first embodiment with the exception as follows. The comparing section comprises two operational amplifiers 16 and 17. The input terminals of the operational amplifiers 16 and 17 are connected in opposite polarities. Their output terminals are connected together. One or the other operational amplifiers will amplify the differential signal and sends it to the output terminal to operate the buzzer 18. The output section comprises operational amplifier 16, amplifier 17, and the buzzer 18.

Figure 4:
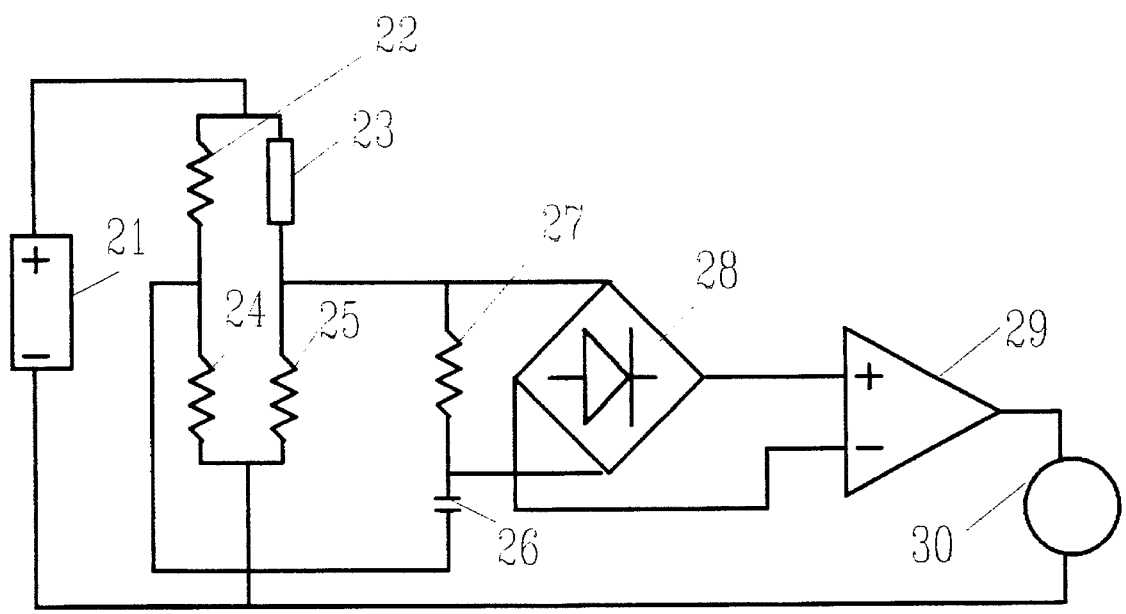
FIG. 4 is an electronic circuit diagram of third embodiment of the present invention.

Referring now to FIG. 4, an electronic circuit of third embodiment will be seen. The sensor section comprises a graphite sensor 23, resistors 22, resistors 24, and resistors 25 forming a resistor bridge.

Figure 7:
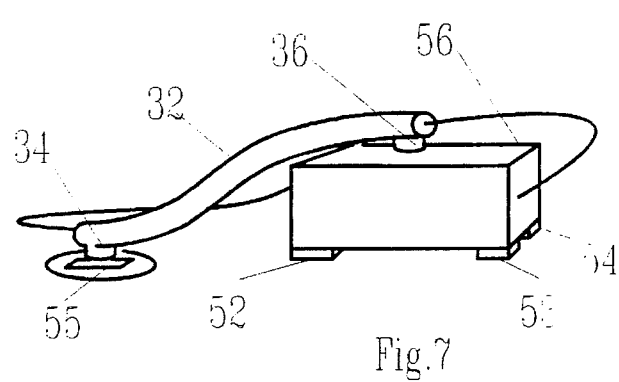
FIG. 7 is an armed alarm system.

FIG. 7 shows an armed alarm system. magnet 34 covers the key hole 55 and magnet 36 is on the top of case 56 which sticks on something by magnets 52, 53 and 54. Moving the hose 32 from the key hole or moving the case 55 will activate the alarm system in the case.

Figure 8:
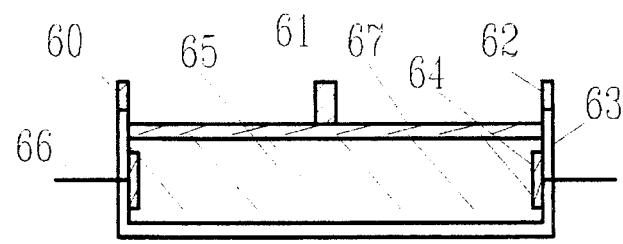
FIG. 8 is a sectional view of an alternative form of a sensor.

An alternative form of the sensor is shown in FIG. 8. It comprising a rigid container 63 of graphite and a softer cover 67 which is stuck to a surface to be detected by magnets 60, 61, and 62. 66 is an electrical connection and 64 is an electrode. A small distortion of the surface will change the resistance of the graphite in the sensor and activate the alarm system.

What is claimed is:

1. An alarm system comprising:

a sensor section, comprising a sensor filled with graphite powder defining the resistance of said sensor, which will change resistance thereof due to a change of the shape of said sensor or natural drifting of resistance thereof, a container for graphite, and a sensor resistor which is connected in series with said sensor so that an electrical potential at the connection between said sensor resistor and said sensor, defining a sensor signal that generates a sensor current to an output of said sensor section, will be changed by a change of the resistance of said sensor, a differential section, which has an input connected to the output of said sensor section, comprising a capacitor and a differential resistor in series where a voltage drop will be generated as a differential signal to an output of said differential section by said sensor current through said differential resistor when said sensor signal is applied to the input of said differential section charging or discharging said capacitor by said sensor current through said differential resistor, the voltage drop corresponds to voltage change above a predetermined level which corresponds to a change in shape of a sensor, a comparing section, which has an input connected to the output of said differential section, comprising a rectifier that rectifies said differential signal to a positive signal which will be sent to an output of said comparing section, an output section, which has an input connected to the output of said comparing section, comprising an amplifier amplifying said positive signal and an alarm device operated by said amplifier, and a differential signal corresponding to a change in shape of said sensor being applied to the comparing and output sections for operating an alarm.

2. An alarm system according to claim 1 wherein said sensor is made of graphite powder defining the resistance of said sensor and said container containing said graphite powder.

3. An alarm system according to claim 1 wherein said sensor has low enough resistance so that said sensor current that flows through said sensor is strong enough to activate said alarm system when the shape of said sensor changes.

4. An alarm system according to claim 1 wherein said container comprises a hose so that said sensor is flexible to different places.

5. An alarm system according to claim 1 wherein said container comprises a rigid shell and a softer cover which sticks to a surface by magnets to detect a change of the shape of said surface by sensing a change of the shape of said softer cover which is a pan of the shape of said sensor.

6. An alarm system according to claim 1 wherein said differential section, comprising said capacitor and said differential resistor in series, where a significant voltage drop will be generated as said differential signal by applying said sensor signal to the input of said differential section and charging or discharging said capacitor through said differential resistor, when the shape of said sensor changes.

7. An alarm system according to claim 1 wherein said differential resistor has sufficiently large resistance to generate said differential signal to activate said alarm system when the shape of said sensor changes.

8. An alarm system according to claim 1 wherein said differential resistor has low enough resistance such that it does not generate said differential signal that is significant enough to activate said alarm system when the shape of said sensor does not change so that said sensor signal which is caused by a drifting of resistance of said sensor is not strong enough to generate said sensor current that is strong enough to generate said differential signal.

9. An alarm system according to claim 1 said capacitor has enough capacity such that it's charging or discharging causes said differential signal that is long and strong enough to activate said alarm system when the shape of said sensor changes.

10. An alarm system according to claim 1 wherein said comparing section comprises a rectifier that rectifies said differential signal to said positive signal that is sent to the output of said comparing section.

11. An alarm system according to claim 1 wherein said output section comprises an amplifier amplifying said positive signal and said alarm device operated by said amplifier.

* * * * *